(12) United States Patent
Matsumoto et al.

(10) Patent No.: US 7,461,555 B2  
(45) Date of Patent: Dec. 9, 2008

(54) ULTRASONIC SENSOR

(75) Inventors: Taku Matsumoto, Ishikawa-gun (JP); Junshi Ota, Hakusan (JP)

(73) Assignee: Murata Manufacturing Co., Ltd, Kyoto (JP)

(*) Notice: Subject to any disclaimer, the term of this patent is extended or adjusted under 35 U.S.C. 154(b) by 379 days.

(21) Appl. No.: 10/597,494

(22) PCT Filed: Apr. 18, 2005

(86) PCT No.: PCT/JP2005/007406

§ 371 (c)(1), (2), (4) Date: Jul. 27, 2006

(87) PCT Pub. No.: WO2005/104615

PCT Pub. Date: Nov. 3, 2005

(65) Prior Publication Data

US 2008/0229830 A1 Sep. 25, 2008

(30) Foreign Application Priority Data

Apr. 26, 2004 (JP) ............................. 2004-130196

(51) Int. Cl.
*G01N 29/00* (2006.01)

(52) U.S. Cl. ............................. 73/649; 73/632; 73/661

(58) Field of Classification Search ............... 73/649, 73/632, 661, 866.5, 596–600, 625, 340, 435
See application file for complete search history.

(56) References Cited

U.S. PATENT DOCUMENTS

| | | | | |
|---|---|---|---|---|
| 4,636,997 A | * | 1/1987 | Toyama et al. ............. | 367/140 |
| 6,484,581 B2 | * | 11/2002 | Nishimoto et al. ............. | 73/579 |
| 6,792,810 B2 | * | 9/2004 | Kupfernagel et al. ......... | 73/632 |
| 7,021,144 B2 | * | 4/2006 | Fukuda et al. ................ | 73/632 |
| 2008/0168841 A1 | * | 7/2008 | Matsuo ........................ | 73/649 |

FOREIGN PATENT DOCUMENTS

| | | | |
|---|---|---|---|
| JP | 08-169288 A | | 7/1996 |
| JP | 10-206529 A | | 8/1998 |
| JP | 02002078089 A | * | 8/2002 |
| JP | 2004-097851 A | | 4/2004 |
| WO | WO2005032211 A1 | * | 4/2005 |

OTHER PUBLICATIONS

Official communication issued in the counterpart Korean Application No. 10-2006-7014595, mailed on May 23, 2007.
International Search Report issued in the corresponding International Application No. PCT/JP2005/007406, mailed on Aug. 9, 2005.

* cited by examiner

*Primary Examiner*—Hezron Williams  
*Assistant Examiner*—J M Saint Surin  
(74) *Attorney, Agent, or Firm*—Keating & Bennett, LLP

(57) ABSTRACT

An ultrasonic sensor includes an integral housing including a plurality of tubular containers that are open at one end and closed by bottom portions at the other end and have side portions extending from the one end to the other end, and at least one connecting portion that connects the plurality of tubular containers. Piezoelectric devices are disposed on respective inner bottom surfaces of the respective bottom portions of the plurality of tubular containers. Side portions of the tubular containers are connected to each other, through a connecting portion, at portions adjacent to bottom portions where the amount of displacement caused by the vibrations of piezoelectric devices is smallest.

10 Claims, 8 Drawing Sheets

ULTRASONIC SENSOR

BACKGROUND OF THE INVENTION

1. Field of the Invention

The present invention relates to an ultrasonic sensor that is used, for example, as a back-up sensor for automobiles.

2. Description of the Related Art

An ultrasonic sensor is a sensor that uses ultrasonic waves to perform sensing. The ultrasonic sensor includes a piezoelectric transducer, which intermittently sends ultrasonic waves (transmission waves) and receives reflected waves (reception waves) from an object. The distance between the ultrasonic sensor and the object is measured via the transmission/reception wave signals. The piezoelectric transducer is disposed on the inner bottom surface of a bottom portion of a tubular container. The tubular container is mounted in a supporting member such that the outer bottom surface, which serves as a vibrating surface, of the bottom portion is located substantially opposite to the object.

Known ultrasonic sensors include a single piezoelectric device acting as both a transmitter and a receiver. In this case, as an ultrasonic sensor and an object approach each other, reverberations of one of a transmission signal and a reception signal affect the other signal more strongly and cause a problem in that the object cannot be properly detected. In a configuration proposed to solve this problem, two piezoelectric devices, one that acts as a transmitter and the other that acts as a receiver, are disposed in respective tubular containers. However, while the effects of reverberating vibrations are reduced, this configuration has led to the problems of an increased number of components and increased assembly costs.

Japanese Unexamined Patent Application Publication No. 10-206529 discloses an ultrasonic transmitting-receiving apparatus in which two piezoelectric devices are disposed in respective tubular containers that are connected together to form an integral housing. This apparatus is configured such that reverberations of both transmission and reception signals are prevented from affecting each other.

FIG. 10 is a cross-sectional view showing an ultrasonic sensor of the ultrasonic transmitting-receiving apparatus disclosed in Japanese Unexamined Patent Application Publication No. 10-206529. In an ultrasonic sensor 90, two tubular containers 92a and 92b and a connecting portion 92c that connects the two tubular containers 92a and 92b form an integral housing 92 having conductivity. An end of the ultrasonic sensor 90 is closed by bottom portions 92a1 and 92b1 acting as vibrating surfaces, while openings at the other end of the ultrasonic sensor 90 are covered with circuit boards 92f and 92g. The two tubular containers 92a and 92b are connected to each other, through the connecting portion 92c, at side portions near the openings of the tubular containers 92a and 92b. Piezoelectric devices 92d and 92e are disposed on the respective inner bottom surfaces of the bottom portions 92a1 and 92b1 of the housing 92. Shielded wires W1 and W2 are connected to the circuit boards 92f and 92g, respectively. Live lead wires 92h1 and 92i1 extending from the circuit boards 92f and 92g, respectively, are connected to the piezoelectric devices 92d and 92e, respectively. Ground lead wires 92h2 and 92i2 extending from the circuit boards 92f and 92g, respectively, are connected to portions of the bottom portions 92a1 and 92b1, respectively, the portions being adjacent to the piezoelectric devices 92d and 92e.

The housing configuration of the ultrasonic sensor disclosed in Japanese Unexamined Patent Application Publication No. 10-206529 enables the tubular containers to be connected together, through the connecting portion 92c, at the side portions near the openings where there are fewer vibrations. Therefore, reverberations caused by one of the piezoelectric devices do not substantially affect the other piezoelectric device. A possible reason for which there are fewer vibrations in the side portions near the openings is that the openings, which are covered with the circuit boards 92f and 92g, are subjected to restraining forces of the circuit boards 92f and 92g.

It is preferable that general ultrasonic sensors have a housing configuration that minimizes interference with vibrations created by piezoelectric transducers. However, as in Japanese Unexamined Patent Application Publication No. 10-206529, covering the openings of the tubular containers with the circuit boards causes interference with such vibrations. If an ultrasonic sensor has a configuration in which openings are not covered, side portions of tubular containers vibrate most strongly at portions near the openings, in response to the vibrations of piezoelectric transducers. Therefore, if tubular containers are connected to each other at side portions near the openings, it is more likely that reverberations of vibrations created by one piezoelectric device affect the other piezoelectric device.

SUMMARY OF THE INVENTION

To overcome the problems described above, preferred embodiments of the present invention provide an ultrasonic sensor having an integral housing including a plurality of tubular containers that are open at one end and closed by bottom portions at the other end and have side portions extending from the one end to the other end, and at least one connecting portion that connects the plurality of tubular containers, and piezoelectric devices disposed on respective inner bottom surfaces of the respective bottom portions of the plurality of tubular containers. In the housing, the side portions of the plurality of tubular containers are connected to each other, through the connecting portion, at portions adjacent to the bottom portions of the tubular containers, with outer bottom surfaces of the respective bottom portions of the plurality of tubular containers being flush with each other. The housing further includes an elastic member that supports the housing.

The resonant frequency of the connecting portion preferably differs from the drive frequency of the piezoelectric devices.

In each of the tubular containers, the thickness of a side portion facing toward another tubular container connected through the connecting portion is preferably greater than the thickness of a side portion that is substantially perpendicular to the side portion facing toward the another tubular container.

The outline of the outer bottom surface of each of the tubular containers is preferably polygonal.

The outer bottom surfaces of the plurality of tubular containers and an outer surface of the connecting portion preferably form a single flat surface.

With the ultrasonic sensor of various preferred embodiments of the present invention, since the plurality of tubular containers are connected to each other at side portions that are adjacent to the bottom portions at which the amount of displacement caused by the vibrations of the piezoelectric transducers is smallest, the reverberations of vibrations created by a piezoelectric transducer cannot easily affect another piezoelectric transducer through the connecting portion. This enables accurate detection of an object even if it is located at a close distance from the ultrasonic sensor.

By varying the resonant frequency of the connecting portion from the drive frequency of the piezoelectric devices, reverberations caused by the vibrations of the piezoelectric transducers are further reduced.

Moreover, in each tubular container, by setting the thickness of a side portion facing toward an adjacent tubular container greater than the thickness of a side portion that is substantially perpendicular to the side portion facing toward the adjacent tubular container, reverberations caused by the vibrations of the piezoelectric transducers are further reduced. It is particularly preferable if the outline of the outer bottom surface of each tubular container is polygonal, for example, rectangular, since a side portion facing toward an adjacent tubular container is in contact with the connecting portion along a straight line and can be formed to have a uniform thickness greater than the thickness of a side portion distant from the connecting portion, and thus, reverberations are reduced.

Moreover, configuring the outer bottom surfaces of the bottom portions of the plurality of tubular containers and the connecting portion adjacent to the outer bottom surfaces so as to form a single flat surface is preferable in terms of appearance since, for example, if the ultrasonic sensor is mounted in a bumper of a vehicle, an even surface is exposed to the outside.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

First Preferred Embodiment

Figure 1:
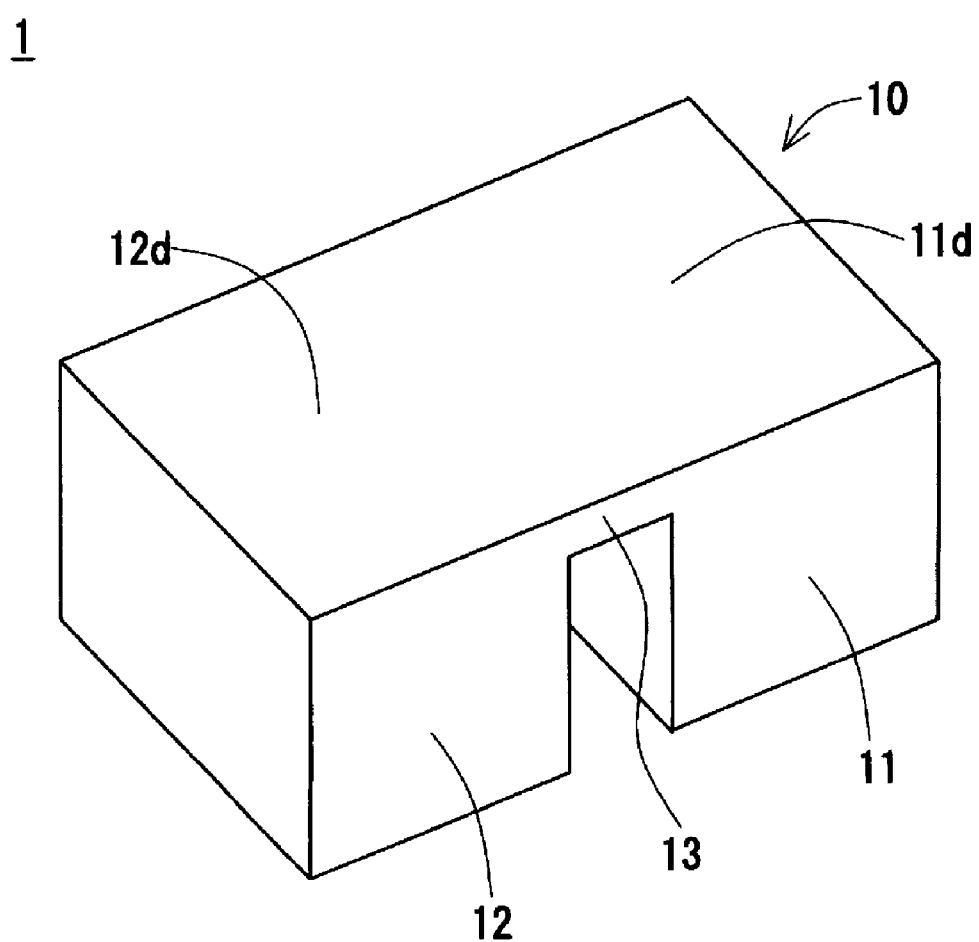
FIG. 1 is an external perspective view of an ultrasonic sensor according to a first preferred embodiment of the present invention.
Figure 2:
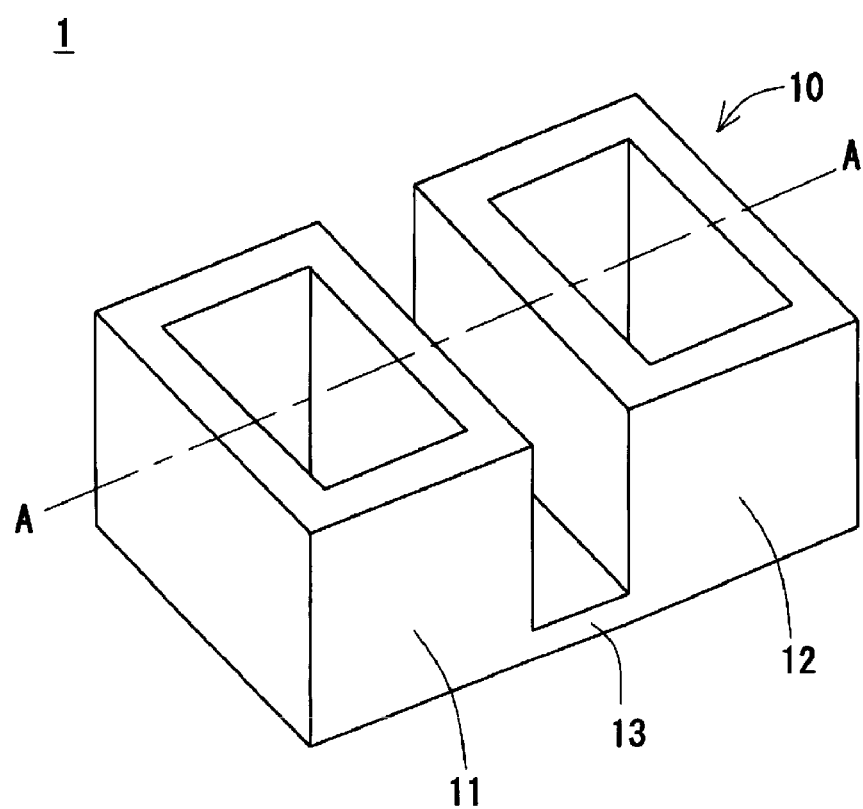
FIG. 2 is an external perspective view of the ultrasonic sensor, as viewed from a different direction.
Figure 3:
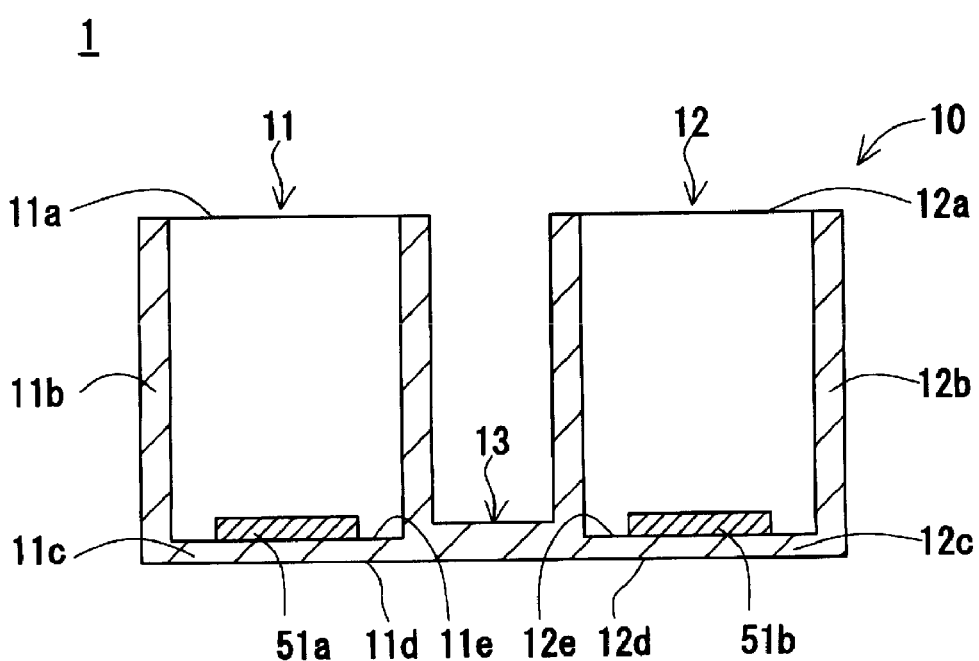
FIG. 3 is a cross-sectional view of the ultrasonic sensor.

FIG. 1 is an external perspective view of an ultrasonic sensor according to the first preferred embodiment of the present invention. FIG. 2 is an external perspective view showing the ultrasonic sensor 1 in FIG. 1 turned upside down. FIG. 3 is a cross-sectional view taken along line A-A in the ultrasonic sensor 1 shown in FIG. 2. In the ultrasonic sensor 1 of the present preferred embodiment, piezoelectric devices 51a and 51b that create vibrations are disposed inside an aluminum housing 10. In the housing 10, two tubular containers 11 and 12 that are open at one end and closed at the other end by bottom portions 11c and 12c are connected together by a connecting portion 13 at end portions of side portions 11b and 12b of the tubular containers 11 and 12, respectively, the end portions being adjacent to the bottom portions 11c and 12c. In other words, the housing 10 is an integral member including the two tubular containers 11 and 12. The connecting portion 13 is defined by a plate having a uniform thickness. The side portions 11b and 12b are also of uniform thickness. As shown in FIG. 1, outer bottom surfaces 11d and 12d of the tubular containers 11 and 12 and an adjacent outer surface of the connecting portion 13 are connected to form a single flat surface. The piezoelectric devices 51a and 51b are disposed on inner bottom surfaces 11e and 12e, respectively, of the respective tubular containers 11 and 12. Lead wires (not shown) are attached to the respective piezoelectric devices 51a and 51b and extend outside the ultrasonic sensor 1 through respective openings 11a and 12a.

The housing configuration of the present preferred embodiment includes side portions of the tubular containers that are connected to each other, by the connecting portion, near the bottom portions of the tubular containers. The reasons that this configuration is used are as follows.

Figure 4A:
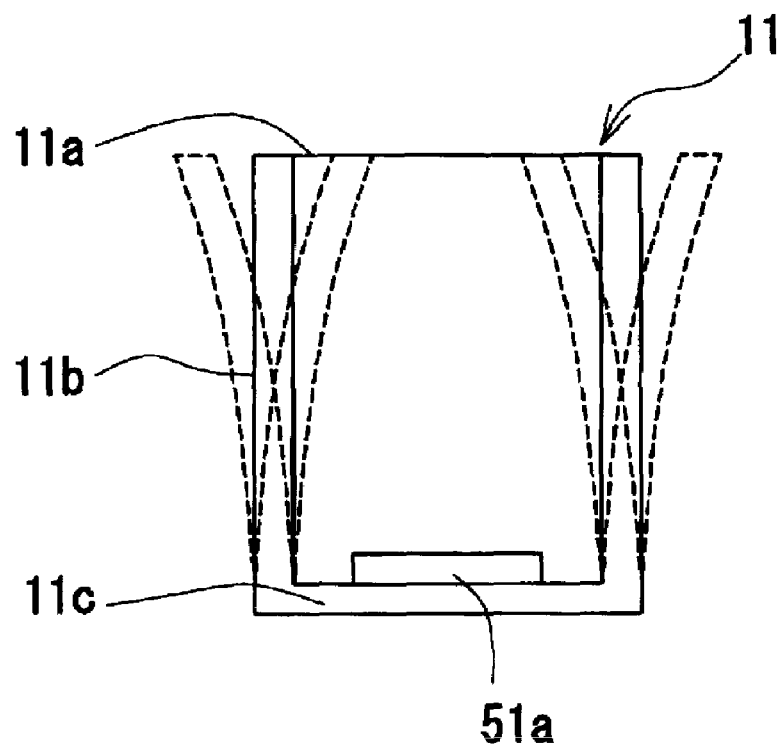
FIG. 4A is a schematic cross-sectional view showing a vibrating state of an ultrasonic sensor.

FIG. 4A is a schematic cross-sectional view showing a state in which the side portion 11b vibrates in response to the drive of the piezoelectric device 51a when a voltage is applied to an ultrasonic sensor 2 having a housing configuration including the single tubular container 11. A power source, lead wires, and other components that are required for voltage application are omitted from FIG. 4A, which schematically illustrates only the piezoelectric device 51a and the housing including the tubular container 11.

Figure 4B:
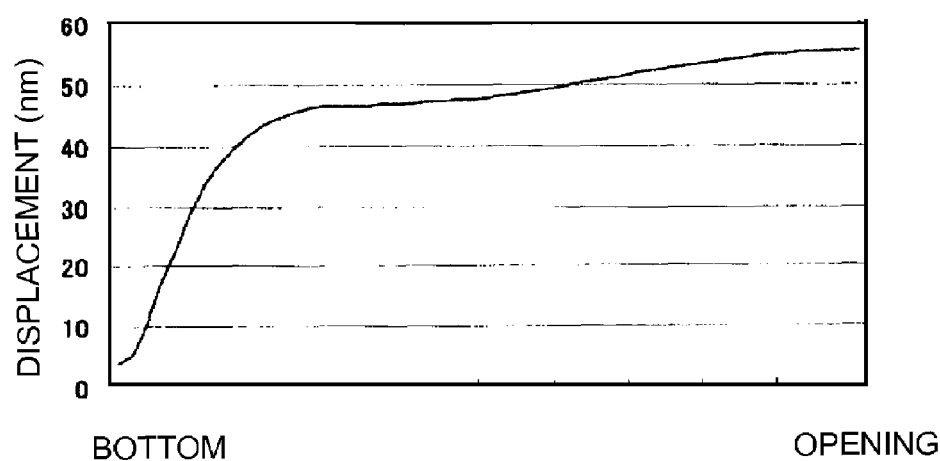
FIG. 4B is a graph showing the amount of displacement of the ultrasonic sensor.

FIG. 4B is a graph showing the amount of displacement (i.e., the width of horizontal vibrations) of the side portion 11b which vibrates in response to the application of a voltage. The horizontal axis represents the location in the side portion ranging from the bottom portion 11c at zero to an opening 11a. The vertical axis represents the amount of displacement. FIG. 4A and FIG. 4B show that the amount of displacement increases as the location in the side portion 11b approaches the opening 11a. This is because, in the side portion 11b, a portion closer to the opening 11a is less affected by the restraining force of the bottom portion 11c while a portion closer to the bottom portion 11c is more affected by the restraining force of the bottom portion 11c, and thus, is inhibited from vibrating. Therefore, in the present preferred embodiment of the present invention, the side portions of the plurality of tubular containers are connected to each other, by the connecting portion, at portions near the bottom portions where the amount of displacement of the side portions is small. In the first preferred embodiment, the connecting portion 13 is disposed at a location that enables the outer bottom surfaces 11d and 12d, where the amount of displacement is smallest, and the outer surface of the connecting portion 13 to form a single flat surface.

The ultrasonic sensor 1 is mounted, for example, in a bumper of a vehicle to be used as a back-up sensor.

Figure 5:
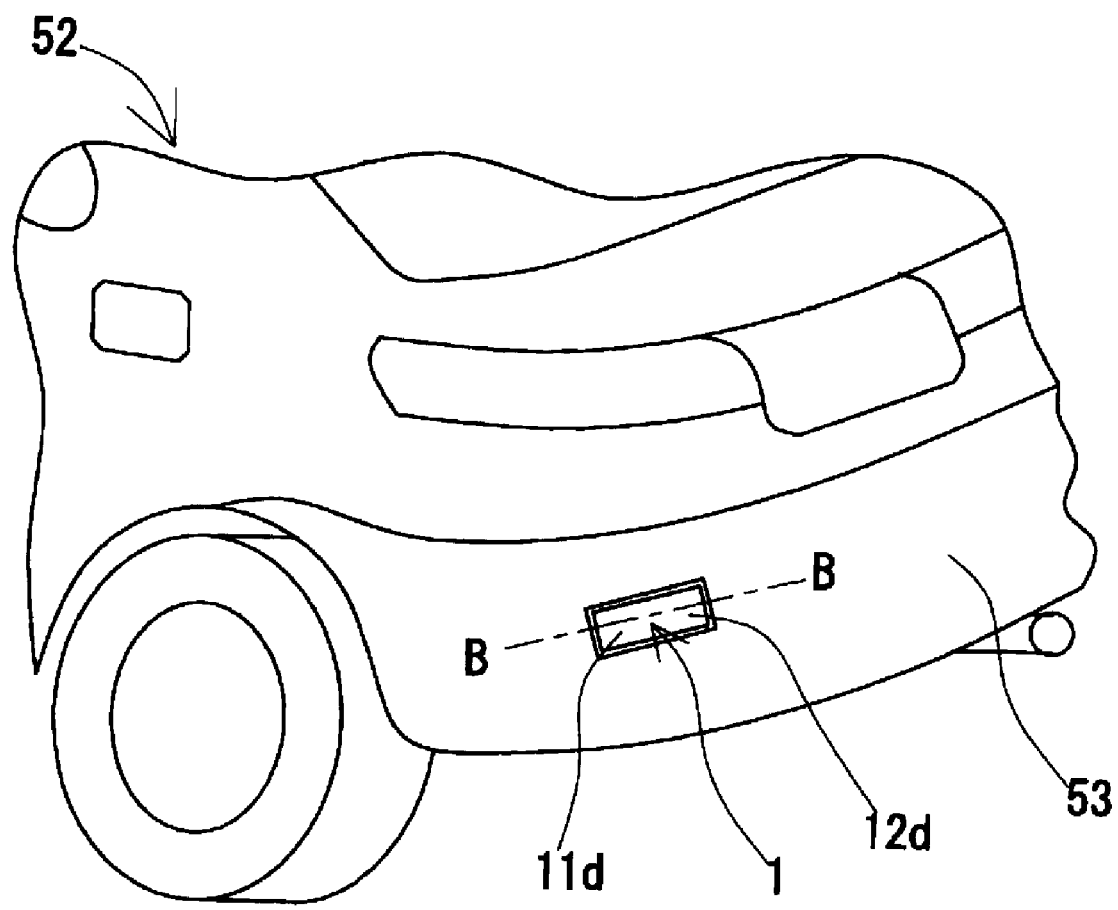
FIG. 5 is a partial perspective view of a vehicle with a rear bumper in which the ultrasonic sensor is mounted.

FIG. 5 is a partial perspective view of the vehicle 52 with the rear bumper 53 in which the ultrasonic sensor 1 is mounted. The outer bottom surfaces 11d and 12d of the ultrasonic sensor 1 are exposed to the outside, with the side portions 11b and 12b and openings 11a and 12a embedded in the rear bumper 53.

Figure 6:
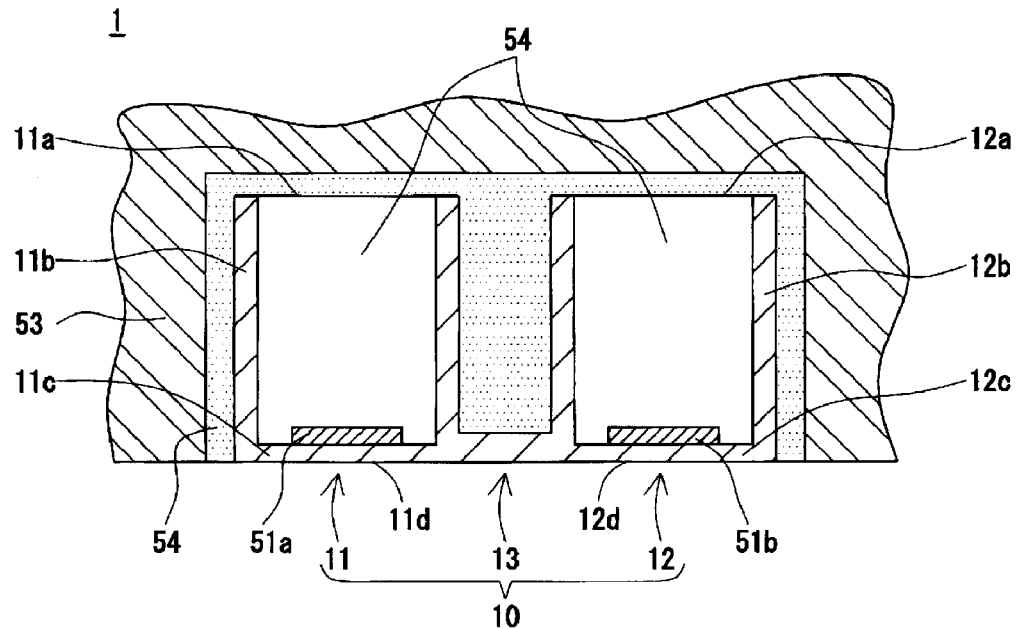
FIG. 6 is a partial cross-sectional view of the vehicle.

FIG. 6 is a partial cross-sectional view taken along line B-B in the vehicle 52 shown in FIG. 5 which shows the ultrasonic sensor 1 as viewed from above. The side portions 11b and 12b are embedded in the bumper 32 while being covered with an elastic member 54 made of rubber or other suitable material. Supporting the housing 10 by the elastic member 23 in this manner enables the tubular containers 11 and 12 to vibrate freely, with virtually no interference, in response to the drive of the piezoelectric devices 51a and 51b, and thus, enables the effects of preferred embodiments of the present invention to be achieved.

In addition to the functional effects described above, the present invention has the effect of enhancing the appearance of ultrasonic sensors, as the exposed surface of the ultrasonic sensor 1 is a single flat surface.

Second Preferred Embodiment

Figure 7:
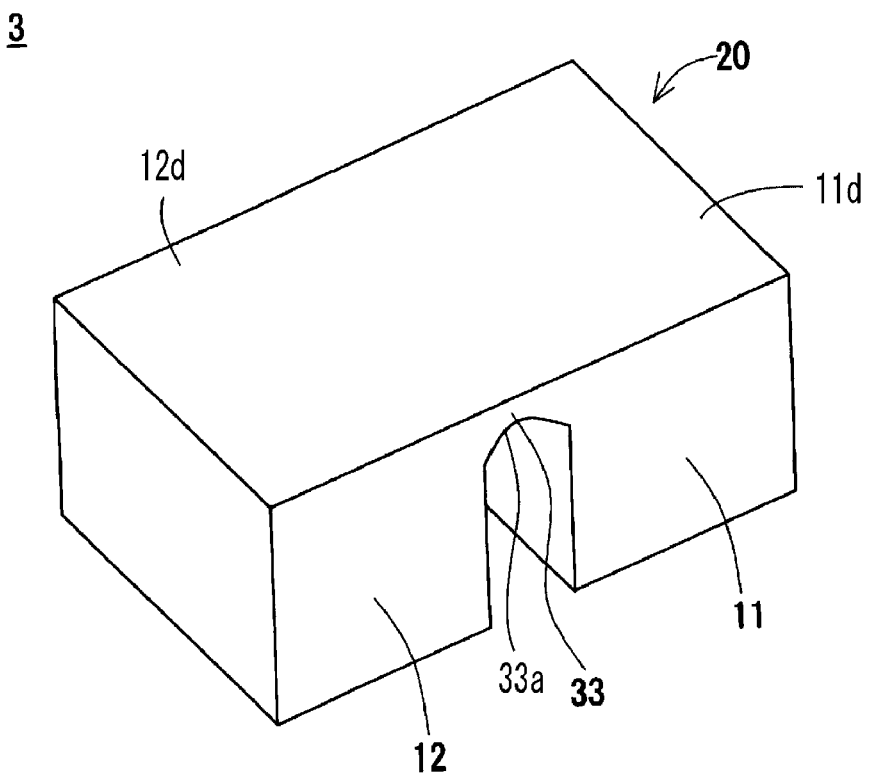
FIG. 7 is an external perspective view of an ultrasonic sensor according to a second preferred embodiment of the present invention.

FIG. 7 is an external perspective view of an ultrasonic sensor according to the second preferred embodiment of the present invention. While the connecting portion 13 of the first preferred embodiment is preferably defined by a plate having uniform thickness, a connecting portion 33 of the present preferred embodiment includes a recessed portion 33a having a reduced thickness. In the tubular containers 11 and 12, the recessed portion 33a is provided on the inner surface opposite the outer surface that is flush with the outer bottom surfaces 11d and 12d. The shapes of the other components of the present preferred embodiment are preferably the same as those of the first preferred embodiment.

Preferred embodiments of the present invention prevent the reverberations of vibrations created by piezoelectric devices disposed in respective tubular containers including an integral housing from affecting each other. Therefore, in the housing configuration described above, two tubular containers are connected to each other at a location at which the amount of displacement caused by vibrations is smallest. In addition, varying the drive frequency of the piezoelectric devices 51a and 51b from the resonant frequency of the connecting portion 33 is preferable because it prevents the vibrations from being easily transmitted. These frequencies can be varied by modifying the shape of the connecting portion 33, for example, by forming a recessed portion, as shown in FIG. 7, or conversely, a raised portion in the connecting portion 33. Another possible method is to adjust the thickness or length of the connecting portion.

Third Preferred Embodiment

Figure 8:
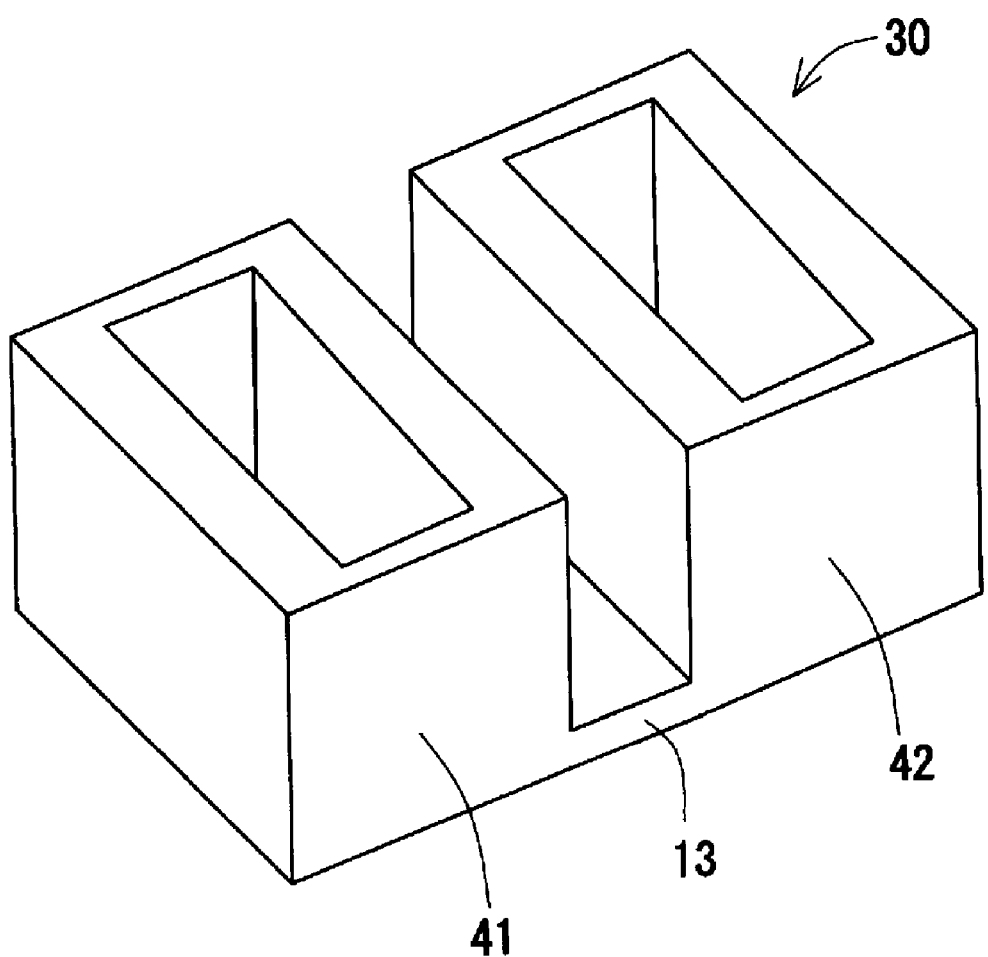
FIG. 8 is an external perspective view of an ultrasonic sensor according to a third preferred embodiment of the present invention.
Figure 9:
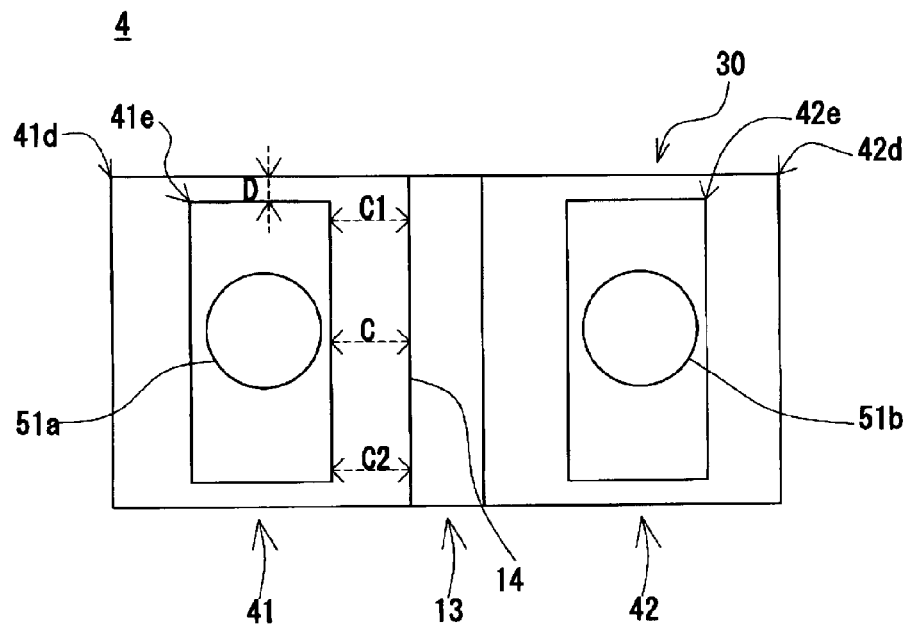
FIG. 9 is a front view of the ultrasonic sensor.
Figure 10:
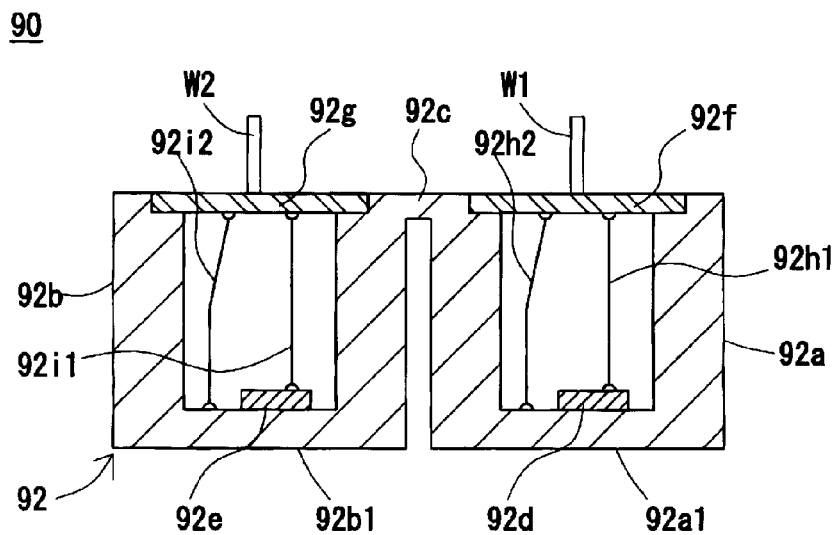
FIG. 10 is an external perspective view of the known ultrasonic sensor.

FIG. 8 is an external perspective view of an ultrasonic sensor according to the third preferred embodiment of the present invention, as viewed from the openings. FIG. 9 is a front view of an ultrasonic sensor 4. The ultrasonic sensor 4 of the present preferred embodiment differs from the ultrasonic sensor 1 of the first preferred embodiment in terms of the thickness of side portions of tubular containers. The shapes of the other components are the same as those of the first preferred embodiment.

The ultrasonic sensor 4 of the present preferred embodiment includes substantially rectangular tubular containers 41 and 42 whose respective side portions do not have uniform thicknesses. In the tubular containers 41 and 42, the thickness C of a side portion connected to the connecting portion is greater than the thickness D of a side portion that is substantially perpendicular to the side portion connected to the connecting portion. Specifically, the distance from the outer edge of each of outer bottom surfaces 41d and 42d, which are substantially rectangular in outline, to the outer edge of each of inner bottom surfaces 41e and 42e, in other words, the thickness of each side portion adjacent to the connecting portion 13 is greater than the thickness D, regardless of the location of a contact point 14 along a line between a side portion and the connecting portion 13 (i.e., thickness C1=C=C2>D). Vibrations of the housing caused by the drive of the piezoelectric devices 51a and 51b are large in thinner portions of the side portions, and small in thicker portions of the side portions. Therefore, a configuration in which the thickness of a side portion adjacent to the connecting portion 13 is greater than the thickness of a side portion distant from the connecting portion 13 further reduces the effects of vibrations.

Although, in the present preferred embodiment, each opening of the housing defined by the tubular containers is preferably substantially rectangular in shape, the present invention is not limited to this. For example, each opening may be circular in shape. Likewise, the shape of each piezoelectric device, which is preferably substantially circular in the present preferred embodiment, is not limited to this, and may alternatively be rectangular.

Although it is preferable that the tubular containers are connected to the connecting portion at side portions closest to the bottom portions, the connecting position of the connecting portion may be slightly shifted toward the openings so as to form a gap therebetween.

Moreover, the number of tubular containers is not limited to two. For example, the present invention is also applicable to a housing configuration in which three tubular containers are connected by two connecting portions.

Moreover, filling the tubular containers with elastic members causes virtually no interference with the vibrations of the housing, and thus, does not adversely influence the effects of the present invention.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An ultrasonic sensor comprising:
   an integral housing including a plurality of tubular containers that are open at one end and closed by bottom portions at the other end and include side portions extending from the one end to the other end, and at least one connecting portion that connects the plurality of tubular containers to one another; and
   piezoelectric devices disposed on respective inner bottom surfaces of the respective bottom portions of the plurality of tubular containers; wherein
   in the integral housing, the side portions of the plurality of tubular containers are connected to each other by the at least one connecting portion at portions that are adjacent to the bottom portions of the plurality of tubular containers such that outer bottom surfaces of the respective bottom portions of the plurality of tubular containers are flush with each other; and
   the housing further includes an elastic member that supports the housing.

2. The ultrasonic sensor according to claim 1, wherein the resonant frequency of the at least one connecting portion differs from the drive frequency of the piezoelectric devices.

3. The ultrasonic sensor according to claim 1, wherein, in each of the plurality of tubular containers, a thickness of a side portion facing toward another of the plurality of tubular containers connected by the connecting portion is greater than a thickness of a side portion that is substantially perpendicular to the side portion facing toward the another of the plurality of tubular containers.

4. The ultrasonic sensor according to claim 1, wherein the outline of the outer bottom surface of each of the plurality of tubular containers is polygonal.

5. The ultrasonic sensor according to claim 1, wherein the outer bottom surfaces of the plurality of tubular containers and an outer surface of the connecting portion are arranged to form a single flat surface.

6. The ultrasonic sensor according to claim 1, wherein the elastic member is made of rubber.

7. The ultrasonic sensor according to claim 1, wherein the at least one connecting portion is defined by a plate having uniform thickness.

8. The ultrasonic sensor according to claim 1, wherein the at least one connecting portion includes a recessed portion having a thickness that is less than a thickness of the remainder of the connecting portion.

9. The ultrasonic sensor according to claim 1, wherein each of the plurality of tubular containers includes side portions having a uniform thickness.

10. The ultrasonic sensor according to claim 1, wherein the outline of the outer bottom surface of each of the plurality of tubular containers is substantially rectangular.

* * * * *